United States Patent
Zhan et al.

(10) Patent No.: US 10,651,905 B1
(45) Date of Patent: May 12, 2020

(54) EIGENVALUE DECOMPOSITION PRECODING MATRIX INDEX SELECTION

(71) Applicant: Samsung Electronics Co., Ltd., Gyeonggi-do (KR)

(72) Inventors: Qi Zhan, San Diego, CA (US); Hongbing Cheng, San Diego, CA (US); Kee-Bong Song, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/256,301

(22) Filed: Jan. 24, 2019

Related U.S. Application Data

(60) Provisional application No. 62/770,326, filed on Nov. 21, 2018.

(51) Int. Cl.
*H04B 7/04* (2017.01)
*H04B 7/0456* (2017.01)
*H04L 27/26* (2006.01)
*H04B 7/06* (2006.01)
*H04B 7/0417* (2017.01)

(52) U.S. Cl.
CPC ......... *H04B 7/0478* (2013.01); *H04B 7/0417* (2013.01); *H04B 7/0639* (2013.01); *H04L 27/266* (2013.01); *H04L 27/2659* (2013.01)

(58) Field of Classification Search
CPC .... H04B 7/043; H04B 7/0478; H04B 7/0417; H04B 7/0639; H04L 27/2659; H04L 27/266
See application file for complete search history.

(56) References Cited

U.S. PATENT DOCUMENTS

| | | |
|---|---|---|
| 7,006,849 B2 | 2/2006 | Li et al. |
| 8,411,783 B2 | 4/2013 | Doron et al. |
| 8,838,051 B1 | 9/2014 | Su et al. |
| 9,769,677 B2 * | 9/2017 | Hsu ...................... H04B 7/0478 |
| 9,876,655 B2 | 1/2018 | Lan et al. |
| 10,024,958 B2 | 7/2018 | Kishigami |
| 2017/0047978 A1 | 2/2017 | Kim et al. |
| 2018/0123654 A1 | 5/2018 | Park et al. |
| 2018/0269941 A1 | 9/2018 | Faxer et al. |

FOREIGN PATENT DOCUMENTS

| | | |
|---|---|---|
| WO | WO 2014190903 | 12/2014 |
| WO | WO 2017107084 | 6/2017 |

* cited by examiner

*Primary Examiner* — Curtis B Odom
(74) *Attorney, Agent, or Firm* — The Farrell Law Firm, P.C.

(57) ABSTRACT

A method and system for selecting precoding matrix index are herein disclosed. The method includes determining a precoder and candidate beams, selecting base beams based on a correlation power between the determined precoder and determined candidate beams, and estimating amplitude coefficients and cophase coefficients based on a correlation between the determined precoder and the selected base beams.

20 Claims, 3 Drawing Sheets

EIGENVALUE DECOMPOSITION PRECODING MATRIX INDEX SELECTION

PRIORITY

This application is based on and claims priority under 35 U.S.C. § 119(e) to a U.S. Provisional Patent Application filed on Nov. 21, 2018 in the United States Patent and Trademark Office and assigned Ser. No. 62/770,326, the entire contents of which are incorporated herein by reference.

FIELD

The present disclosure relates generally to a method and system for selecting precoding matrix indices.

BACKGROUND

Legacy precoding matrix index (PMI) selection methods based on codebook search are increasingly impractical due to the large codebook size. Existing implementation usually use greedy search methods to select the PMI which has high complexity, resulting in low performance.

SUMMARY

According to one embodiment, a method is provided. The method includes determining a precoder and candidate beams, selecting base beams based on a correlation power between the determined precoder and determined candidate beams, and estimating amplitude coefficients and cophase coefficients based on a correlation between the determined precoder and the selected base beams.

According to one embodiment, a system is provided. The system includes a receiver, a transmitter, and a processor configured to determine a precoder and candidate beams, select base beams based on a correlation power between the determined precoder and determined candidate beams, and estimate amplitude coefficients and cophase coefficients based on a correlation between the determined precoder and the selected base beams.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
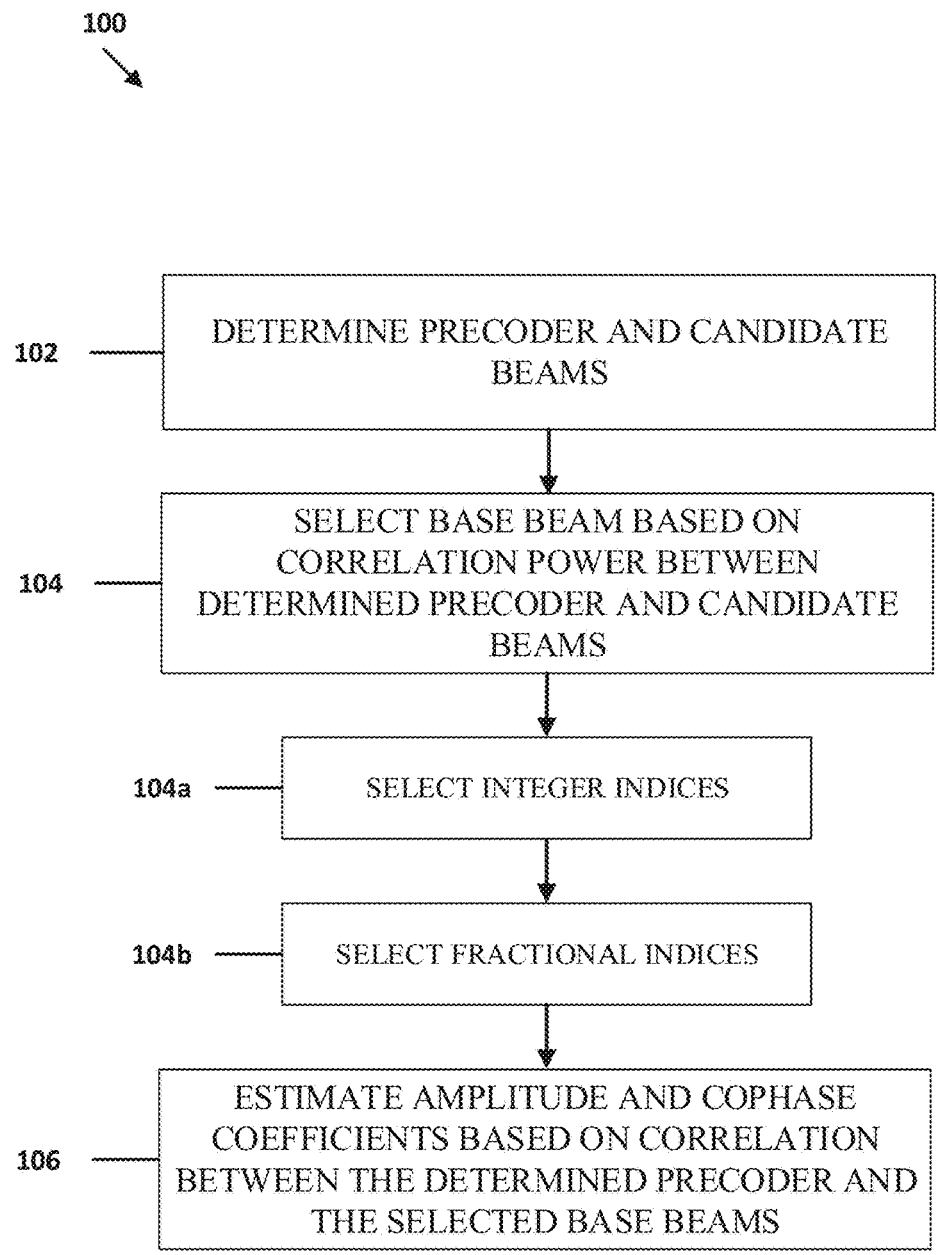
FIG. 1 is a flowchart for a method of selecting a PMI algorithm/process, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1$^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

The present systems, methods, and devices are targeted at improving the PMI selection accuracy based on eigenvalue decomposition (ED). The present systems, methods, and devices exploit the codebook structure and estimate the PMI based on the correlation between the ideal ED precoder and the PMI candidates.

Disclosed herein is a two-stage PMI selection method. First, the ideal precoder is computed by ED and the base beams indices are selected based on the correlation power between the ideal ED precoder and all the candidate beams. Second, the amplitude and cophase coefficients are estimated based on the correlation between the ideal ED precoder and the selected beams. The present systems, methods, and devices reduce ED dimensions to reduce complexity, and they can be applied to any linear combination structure codebook.

The PMI selection is based on finding the candidate codeword that has highest correlation power with the ideal ED precoder. In some examples, a correlation based beam selection method is used for the specific beam selection constraints in eFD-MIMO. The amplitude and cophase coefficients are estimated based on the correlation between ideal ED precoder and the selected beams.

FIG. 1 is a flowchart 100 for a method of selecting a PMI algorithm/process, according to an embodiment. At 102, the present system determines an ideal precoder and candidate beams. The ideal precoder may be determined/computed by singular value decomposition (SVD).

The eigenvector of $H^H H$ on r-th polarization of the l-th layer of the j-th subcarrier is denoted as $v_{r,l,j}$. The precoding vector on the r-th polarization, l-th layer of the k-th subband is donated as $w_{r,l,k}$. Defining $k_1=[k_1^{(0)}, k_1^{(1)}, \ldots, k_1^{(L-1)}]$, $k_2=[k_2^{(0)}, k_2^{(1)}, \ldots, k_2^{(L-1)}]$, $p_{r,l,k}=[p_{r,l,0,k}, p_{r,l,1,k}, \ldots, p_{r,l,L-1,k}]$ and $c_{r,l,k}=[c_{r,l,0,k}, c_{r,l,1,k}, \ldots, c_{1,l,L-1,k}]$, the precoding vector is set as Equation (1):

$$w_{r,l,k} = f(k_1, k_2, p_{r,l,k}, c_{r,l,k}) = \sum_i p_{r,l,i,k} c_{r,l,i,k} b_{k_1^{(i)}, k_2^{(i)}} \quad (1)$$

with Equation (2):

$$b_{k_1,k_2} = \left[ e^{j\frac{2\pi k_1 \times 0}{N_1 O_1}}, e^{j\frac{2\pi k_1 \times 1}{N_1 O_1}}, \ldots, e^{j\frac{2\pi k_1 \times (N_1-1)}{N_1 O_1}} \right]^T \otimes \quad (2)$$

-continued
$$\left[ e^{j\frac{2\pi k_2 \times 0}{N_2 O_2}}, e^{j\frac{2\pi k_2 \times 1}{N_2 O_2}}, \ldots, e^{j\frac{2\pi k_2 \times (N_2-1)}{N_2 O_2}} \right]^T$$

where $\begin{cases} k_1 = 0, 1, \ldots, N_1 O_1 - 1 \\ k_2 = 0, 1, \ldots, N_2 O_2 - 1 \end{cases}$ For beam selection, the metric function is defined as Equation (3):

$$J(\hat{k}_1, \hat{k}_2) = \sum_{i=0}^{L-1} \beta_i^2 \quad (3)$$

with the correlation power defined as Equation (4):

$$\beta_i^2 = \sum_r \sum_l \sum_j \rho_{r,l,i,j}^2 \quad (4)$$

and considering Equation (5):

$$\hat{k}_1, \hat{k}_2 = \underset{k_1, k_2}{\operatorname{argmax}} J(k_1, k_2) \quad (5)$$

the correlation is defined as $$\rho_{r,l,i,j} = b_{x_i}^H v_{r,l,j},$$

and the L selected beams are $b_{x_0}, b_{x_1}, \ldots, b_{x_{L-1}}$.

At 104, the present system selects base beams based on correlation power between the determined precoder and the candidate beams, and 102 may be carried out using part or all of the candidate beams.

For a two-dimensional discrete Fourier transform (2D-DFT) codebook, Equation (6), (7), (8), and (9) are known as:

$$k_1^{(i)} = O_1 n_1^{(i)} + q_1, i=0, \ldots, L-1 \quad (6)$$

$$k_2^{(i)} = O_2 n_2^{(i)} + q_2, i=0, \ldots, L-1 \quad (7)$$

$$q_1 = 0, \ldots, O_1 - 1, q_2 = 0, \ldots, O_2 - 1 \quad (8)$$

$$n_1^{(i)} = 0, \ldots, N_1 - 1, n_2^{(i)} = 0, \ldots, N_2 - 1 \quad (9)$$

This indicates that these L beams must have the same frequency rotation factor ($q_1$ and $q_2$). When codebook subset restriction (CBSR) is applied, $n_1^{(i)}$ and $n_2^{(i)}$ are restricted to subsets of $\{0, \ldots, N_1-1\}$ and $\{0, \ldots, N_2-1\}$ separately. An example without CBSR is described below, and it could be easily applied by limiting the search space.

Since these L beams always share the same frequency rotation factor $q_1$ and $q_2$, searching the q values in the beam selection process (fractional indices selection) can be conducted first. For each candidate pair ($q_1$, $q_2$), the L best beams (integer indices selection) are selected and denoted as $b_{x_i}(q_1, q_2)$, $i=0,1, \ldots, L-1$. The candidate L integer indices with the maximum correlation metric are selected and the L beams are chosen accordingly.

For each hypothesis of $q_1$ and $q_2$, the valid set of precoding vector are denoted as Equation (10):

$$B'(q_1, q_2) = (R_{N_1}(q_1) D_{N_1}) \otimes (R_{N_2}(q_2) D_{N_2}) \quad (10)$$

where $D_N$ is a DFT matrix with size N and $R_{N_i}(q_i)$ is the frequency rotation matrix, denoted as Equation (11):

$$R_{N_i}(q_i) = \mathrm{diag}\left(\left[e^{j2\pi \cdot 0 \cdot \frac{q_i}{N_i O_i}} \ e^{j2\pi \cdot 1 \cdot \frac{q_i}{N_i O_i}} \ \ldots \ e^{j2\pi \cdot (N_i-1) \cdot \frac{q_i}{N_i O_i}}\right]\right), \quad (11)$$

$$0 \le q_i < O_i, \ i = 1 \text{ or } 2$$

$q_1$ and $q_2$ are assumed to not change, and thus $(q_1, q_2)$ is omitted in the notation for simplicity. Additionally, $B' = [b_0, b_1, \ldots, b_{N_1 N_2 - 1}]$ where $b_i$ is the i-th column of the matrix $B'$ representing the i-th precoding vector.

At 104a, the present system selects integer indices.

With NR type II CSI codebook, for a candidate pair of $(q_1, q_2)$, the best L beams $(b_{x_0}, b_{x_1}, \ldots, b_{x_{L-1}})$ are selected from $B'$ by Equation (12):

$$(\hat{x}_0, \hat{x}_1, \ldots, \hat{x}_{L-1}) = \arg\max_{x_0, x_1, \ldots, x_{L-1}} M(x_0, x_1, \ldots, x_{L-1}) \quad (12)$$

$$M(x_0, x_1, \ldots, x_{L-1}) = \sum_{i=0}^{L-1} (\beta_{x_i})^2$$

where $\beta_i$ is defined in Equation (4) and $\beta_i$ for $i = 0 \ldots N_1 N_2 - 1$ needs to be computed. $M(x_0, x_1, \ldots, x_{L-1})$ is exactly the same as $J(\hat{k}_1, \hat{k}_2) = J(\hat{k}_1^{(0)}, \hat{k}_2^{(0)}, \hat{k}_1^{(1)}, \hat{k}_2^{(1)}, \ldots \hat{k}_1^{(L-1)}, \hat{k}_2^{(L-1)})$ calculated in Equation (3) except a different index mapping. The L largest elements which maximize the metric can be found by traversing the $\beta_i^2$ array one time with a maximum heap. In full-dimension MIMO (eFD-MIMO), there is a constraint on the distance between the two selected beams and it no longer exists in the new radio (NR) type II channel state information (CSI) codebook. The above integer beam indices selection for NR type II CSI codebook is different for eFD-MIMO.

For eFD-MIMO, the maximization of Equations (3) and (12) for a candidate pair of $(q_1, q_2)$ is can be used to find the first beam with index x and the second beam with index y that maximize the metric M of Equation (13) and satisfy the second beam selection constraint.

$$(\hat{x}, \hat{y}) = \arg\max_{x,y} M(x, y) \quad (13)$$

$$M(x, y) = \begin{cases} (\beta_x)^2 + (\beta_y)^2, & \text{if } \beta_y \le \beta_x \\ \frac{1}{2}(\beta_x + \beta_y)^2, & \text{if } \beta_y > \beta_x \end{cases}$$

Equation (13) is subject to Equation (14):

$$\mathrm{mod}(y - x, N_1 N_2) \le K, K = \min(N_1, L_1) \times \min(N_2, L_2) - 1 \quad (14)$$

Figure 2:
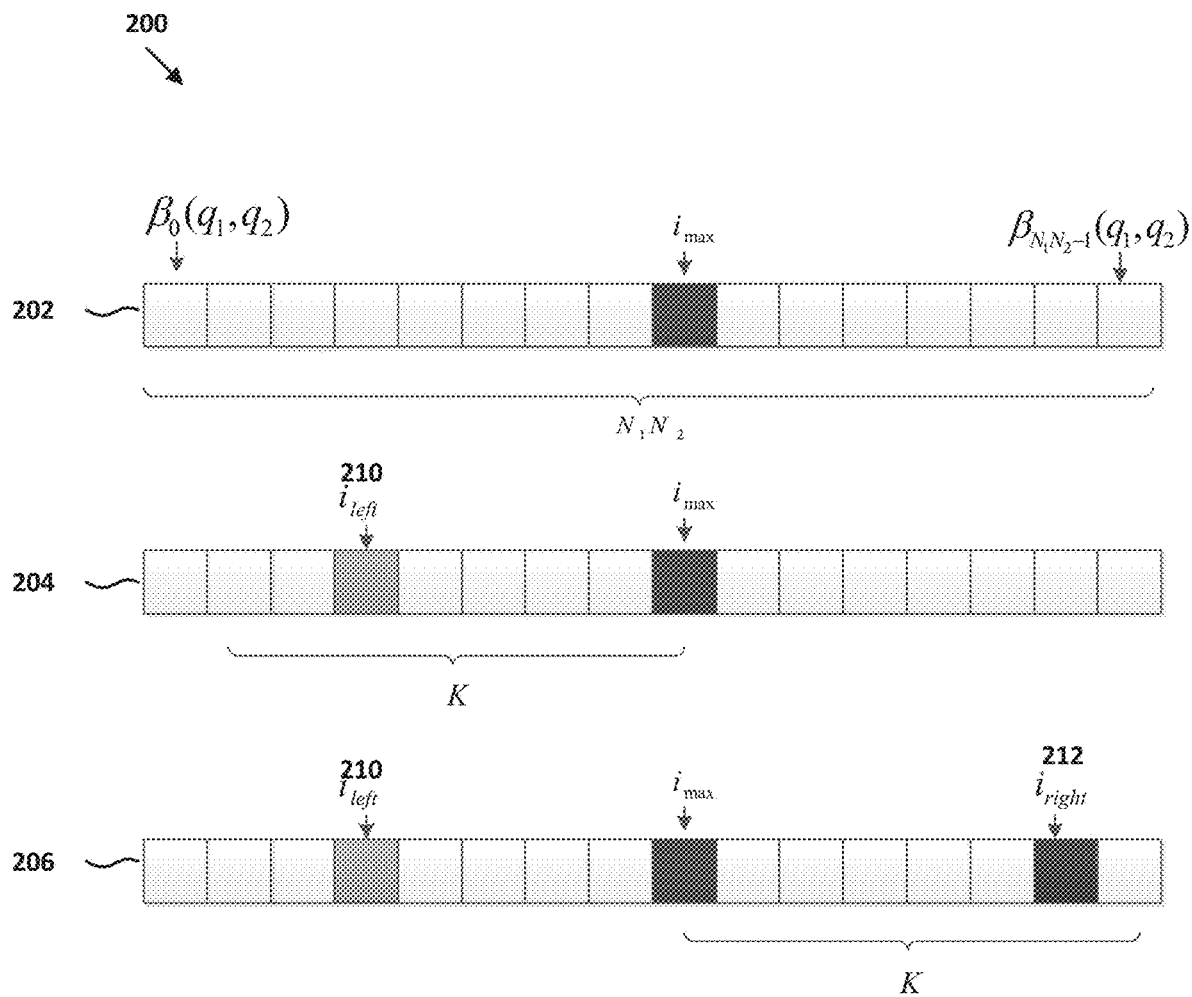
FIG. 2 is a diagram of a linear complexity method used to find indices, according to an embodiment.

FIG. 2 is a diagram 200 of a linear complexity method used to find indices x and y, according to an embodiment. First, at 202, the maximum value of $\beta_{i_{max}}$, $0 \le i_{max} < N_1 N_2 - 1$ is found. Then, at 204, the left side local maximum value of $\beta_{i_{left}}$, $\mathrm{mod}(i_{max} - i_{left}) \le K$ is found. For example, index 210 may be the left side local maximum value. Then, at 206, the right side local maximum value of $\beta_{i_{right}}$, $\mathrm{mod}(i_{right} - i_{max}) \le K$ is found. For example, index 212 may be the right side local maximum value. Then, $$\frac{1}{2}(\beta_{i_{left}} + \beta_{i_{max}})^2$$

and $(\beta_{i_{max}})^2 + (\beta_{i_{right}})^2$ are compared and the larger one is selected. The corresponding beam indices are $(i_{left}, i_{max})$ or $(i_{max}, i_{right})$.

At 104b, the present system selects fractional indices. For each candidate pair of $(q_1, q_2)$, L beams are found as described above and have the corresponding maximum value of M denoted as $\overline{M}_{q_1, q_2}$. $(q_1, q_2)$ is selected by Equation (15):

$$(\hat{q}_1, \hat{q}_2) = \arg\max_{q_1, q_2} \overline{M}_{q_1, q_2}, 0 \le q_i < O_i, \quad (15)$$

The selected integer and fractional indices are mapped to $k_1^{(i)}$, $k_2^{(i)}$ as Equations (16) and (17):

$$k_1^{(i)} = \left\lfloor \frac{x_i}{N_2} \right\rfloor \cdot O_1 + q_1 \quad (16)$$

$$k_2^{(i)} = \lfloor x_i \% N_2 \rfloor \cdot O_2 + q_2 \quad (17)$$

The index operations in Equations (16) and (17) are integer operations, and the % operation represents remainder after division (modulo operation).

At 106, the present system estimates the amplitude and cophase coefficients based on correlation between the determined precoder and the selected beams. The cophase coefficients are configured per subband while subband amplitude scaling is optional. $p_{r,l,i,k}$ is denoted as $p_{r,l,i,k} = \hat{p}_{r,l,i}^{WB} \cdot \hat{p}_{r,l,i,k}^{SB}$, $\hat{p}_{r,l,i}^{WB}$ is the wideband amplitude scaling factor shared among $N_{SB}$ subbands and $\hat{p}_{r,l,i,k}^{SB}$ is for per subband amplitude scaling adjustment.

According to the type II codebook, for each layer the coefficient of the strongest beam out of 2 L coefficients is 1. Assuming the strongest beam is on the r'-th polarization which is dependent on layer index l and subband index k, to achieve the above maximum value of $J(k_1, k_2)$, the optimum solution for cophases $c_{r,l,i,k}$ on the k-th subband is expressed as Equation (18):

$$\hat{c}_{r,l,i,k} = \frac{\rho_{r',l,0,k} \rho_{r,l,i,k}^*}{|\rho_{r',l,0,k} \rho_{r,l,i,k}^*|} \quad (18)$$

and the optimum solutions for $\hat{p}_{r,l,i}^{WB}$ and $\hat{p}_{r,l,i,k}^{SB}$ are in Equations (19) and (20):

$$\hat{p}_{r,l,i}^{WB} = \sqrt{\frac{\sum_{k=0}^{N_{SB}-1} \rho_{r,l,i,k}^2}{\sum_{k=0}^{N_{SB}-1} \rho_{r',l,0,k}^2}} \quad (19)$$

$$\hat{p}_{r,l,i,k}^{SB} = \frac{|\rho_{r,l,i,k}|}{|\rho_{r',l,0,k}| \hat{p}_{r,l,i}^{WB}} \quad (20)$$

Both the cophases and the amplitude scaling factor need to be quantized before feedback and the number of bits are configurable. With $L = 2$, it is similar to the advanced CSI configuration in LTE eFD-MIMO. The optimum solution is found as Equations (21) and (22):

$$\frac{\hat{c}_{r,l,1,k}}{\hat{c}_{r,l,0,k}} = \frac{\rho_{r,l,0,k_{mid}} \rho^*_{r,l,1,k_{mid}}}{|\rho_{r,l,0,k_{mid}} \rho^*_{r,l,1,k_{mid}}|} \quad (21)$$

$$\frac{\hat{p}_{r,l,1,k}}{\hat{p}_{r,l,0,k}} = \frac{|\rho_{r,l,1,k_{mid}}|}{|\rho_{r,l,0,k_{mid}}|} \quad (22)$$

Referring back to 102 of FIG. 1, due to hardware limitations, the ideal SVD precoder may be determined based on a reduced dimension calculation, such that a 4×4 ED calculation is not required. This can be achieved by approximating the 4 Rx channel by a 2 Rx channel since the type II CSI only applies for up to rank 2 cases. The received signal in the time domain is as Equation (23):

$$Y = HPx, H = \begin{bmatrix} H_1 \\ H_2 \end{bmatrix} \quad (23)$$

where the size of Y is 4×1, H is 4×16, P is 16×2, x is 2×1, $H_1$ is 2×16, $H_2$ is 2×16. A linear combination is used at the receiver side to combine the 4 Rx channel and get a 2 Rx combined channel as shown in Equation (24):

$$\tilde{H} = (W_1 H_1 + W_2 H_2) P \quad (24)$$

The right Eigen vector of H can be calculated by 2×2 ED, since $\tilde{H}\tilde{H}^H$ is a 2×2 matrix. The channel H can be approximated by $\tilde{H}$ and then the above described correlation based PMI selection can be carried out.

Multiple options exist for selecting $W_1$ and $W_2$. First, $W_1 = U_1^H$ and $W_2 = U_2^H$ can be set heuristically with $H_1 = U_1 D_1 V_1^H$ and $H_2 = U_2 D_2 V_2^H$. Second, setting $W_1 = I$ and $W_2 = 0$. Third, setting $W_1 = I$ and $W_2 = I$. Fourth, selecting the two Rx with the strongest receive power.

Figure 3:
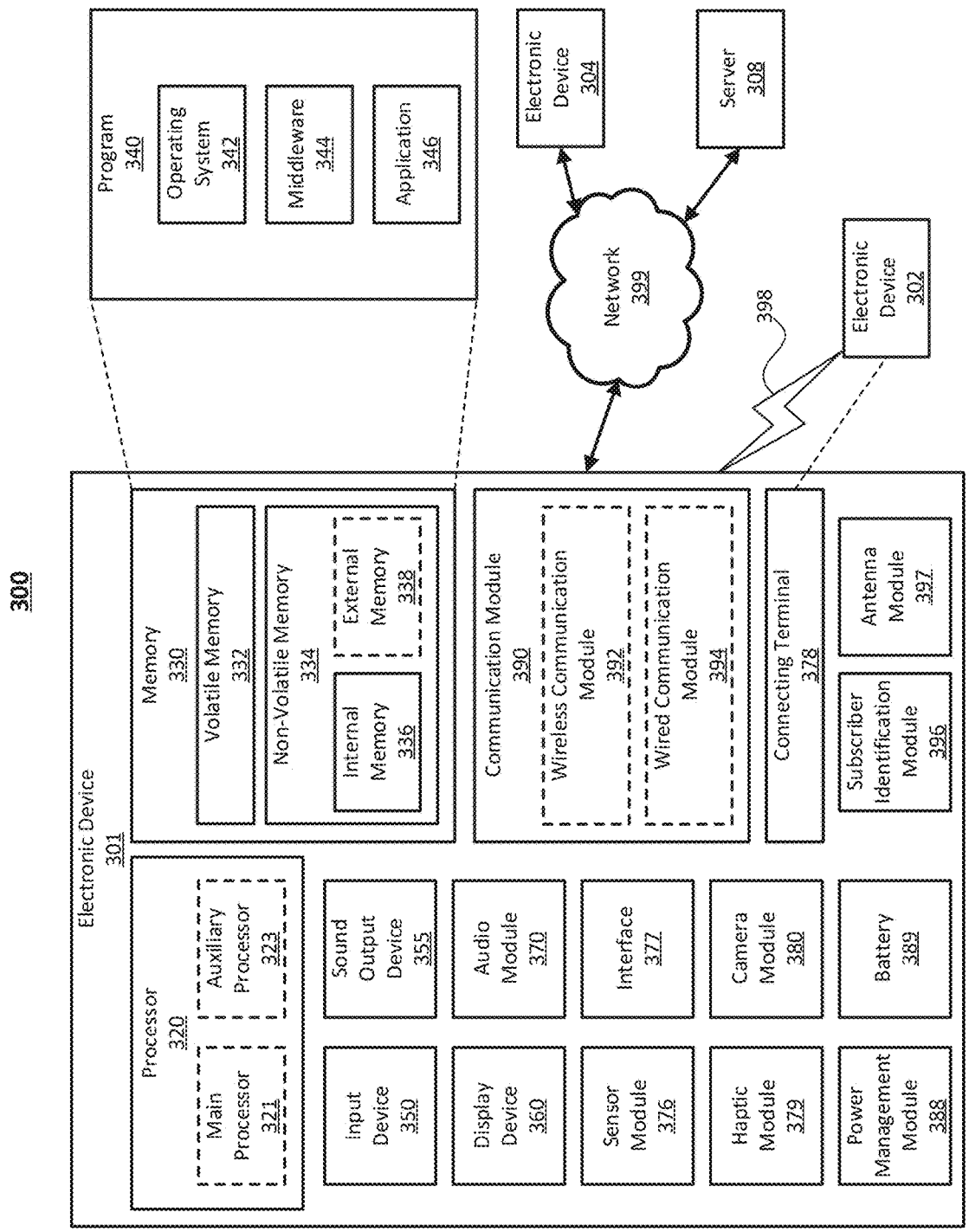
FIG. 3 is a block diagram of an electronic device in a network environment, according to one embodiment.

FIG. 3 is a block diagram of an electronic device 301 in a network environment 300, according to one embodiment. Referring to FIG. 3, the electronic device 301 in the network environment 300 may communicate with an electronic device 302 via a first network 398 (e.g., a short-range wireless communication network), or an electronic device 304 or a server 308 via a second network 399 (e.g., a long-range wireless communication network). The electronic device 301 may communicate with the electronic device 304 via the server 308. The electronic device 301 may include a processor 320, a memory 330, an input device 350, a sound output device 355, a display device 360, an audio module 370, a sensor module 376, an interface 377, a haptic module 379, a camera module 380, a power management module 388, a battery 389, a communication module 390, a subscriber identification module (SIM) 396, or an antenna module 397. In one embodiment, at least one (e.g., the display device 360 or the camera module 380) of the components may be omitted from the electronic device 301, or one or more other components may be added to the electronic device 301. In one embodiment, some of the components may be implemented as a single integrated circuit (IC). For example, the sensor module 376 (e.g., a fingerprint sensor, an iris sensor, or an illuminance sensor) may be embedded in the display device 360 (e.g., a display).

The processor 320 may execute, for example, software (e.g., a program 340) to control at least one other component (e.g., a hardware or a software component) of the electronic device 301 coupled with the processor 320, and may perform various data processing or computations. As at least part of the data processing or computations, the processor 320 may load a command or data received from another component (e.g., the sensor module 376 or the communication module 390) in volatile memory 332, process the command or the data stored in the volatile memory 332, and store resulting data in non-volatile memory 334. The processor 320 may include a main processor 321 (e.g., a central processing unit (CPU) or an application processor (AP)), and an auxiliary processor 323 (e.g., a graphics processing unit (GPU), an image signal processor (ISP), a sensor hub processor, or a communication processor (CP)) that is operable independently from, or in conjunction with, the main processor 321. Additionally or alternatively, the auxiliary processor 323 may be adapted to consume less power than the main processor 321, or execute a particular function. The auxiliary processor 323 may be implemented as being separate from, or a part of, the main processor 321.

The auxiliary processor 323 may control at least some of the functions or states related to at least one component (e.g., the display device 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to one embodiment, the auxiliary processor 323 (e.g., an image signal processor or a communication processor) may be implemented as part of another component (e.g., the camera module 380 or the communication module 390) functionally related to the auxiliary processor 323.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software, and may include, for example, an operating system (OS) 342, middleware 344, or an application 346.

The input device 350 may receive a command or data to be used by other component (e.g., the processor 320) of the electronic device 301, from the outside (e.g., a user) of the electronic device 301. The input device 350 may include, for example, a microphone, a mouse, or a keyboard.

The sound output device 355 may output sound signals to the outside of the electronic device 301. The sound output device 355 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 360 may visually provide information to the outside (e.g., a user) of the electronic device 301. The display device 360 may include, for example, a display, a hologram device, or a projector and control circuitry to control a corresponding one of the display, hologram device, and projector. According to one embodiment, the display device 360 may include touch circuitry adapted to detect a touch, or sensor circuitry (e.g., a pressure sensor) adapted to measure the intensity of force incurred by the touch.

The audio module 370 may convert a sound into an electrical signal and vice versa. According to one embodiment, the audio module 370 may obtain the sound via the input device 350, or output the sound via the sound output device 355 or a headphone of an external electronic device 302 directly (e.g., wiredly) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. The sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device 302 directly (e.g., wiredly) or wirelessly. According to one embodiment, the interface 377 may include, for example, a high definition multimedia interface (HDMI), a universal serial bus (USB) interface, a secure digital (SD) card interface, or an audio interface.

A connecting terminal 378 may include a connector via which the electronic device 301 may be physically connected with the external electronic device 302. According to one embodiment, the connecting terminal 378 may include, for example, an HDMI connector, a USB connector, an SD card connector, or an audio connector (e.g., a headphone connector).

The haptic module 379 may convert an electrical signal into a mechanical stimulus (e.g., a vibration or a movement) or an electrical stimulus which may be recognized by a user via tactile sensation or kinesthetic sensation. According to one embodiment, the haptic module 379 may include, for example, a motor, a piezoelectric element, or an electrical stimulator.

The camera module 380 may capture a still image or moving images. According to one embodiment, the camera module 380 may include one or more lenses, image sensors, image signal processors, or flashes.

The power management module 388 may manage power supplied to the electronic device 301. The power management module 388 may be implemented as at least part of, for example, a power management integrated circuit (PMIC).

The battery 389 may supply power to at least one component of the electronic device 301. According to one embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the AP) and supports a direct (e.g., wired) communication or a wireless communication. According to one embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as Bluetooth™, wireless-fidelity (Wi-Fi) direct, or a standard of the Infrared Data Association (IrDA)) or the second network 399 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The antenna module 397 may transmit or receive a signal or power to or from the outside (e.g., the external electronic device) of the electronic device 301. According to one embodiment, the antenna module 397 may include one or more antennas, and, therefrom, at least one antenna appropriate for a communication scheme used in the communication network, such as the first network 398 or the second network 399, may be selected, for example, by the communication module 390 (e.g., the wireless communication module 392). The signal or the power may then be transmitted or received between the communication module 390 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 301 and the external electronic device 304 via the server 308 coupled with the second network 399. Each of the electronic devices 302 and 304 may be a device of a same type as, or a different type, from the electronic device 301. All or some of operations to be executed at the electronic device 301 may be executed at one or more of the external electronic devices 302, 304, or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 301. The electronic device 301 may provide the outcome, with or without further processing of the outcome, as at least part of a reply to the request. To that end, a cloud computing, distributed computing, or client-server computing technology may be used, for example.

One embodiment may be implemented as software (e.g., the program 340) including one or more instructions that are stored in a storage medium (e.g., internal memory 336 or external memory 338) that is readable by a machine (e.g., the electronic device 301). For example, a processor of the electronic device 301 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method for selecting precoding matrix index (PMI), comprising:
   determining a precoder and candidate beams;
   selecting base beams based on a correlation power between the determined precoder and determined candidate beams; and
   estimating amplitude coefficients and cophase coefficients based on a correlation between the determined precoder and the selected base beams.

2. The method of claim 1, wherein the precoder is determined by a reduced dimension singular value decomposition (SVD).

3. The method of claim 2, wherein the reduced dimension SVD reduces the precoder determination from a 4×4 SVD calculation to a 2×2 SVD calculation.

4. The method of claim 1, wherein selecting base beams further comprises selecting integer indices.

5. The method of claim 4, wherein selecting integer indices is based on linear complexity in a multiple input multiple output (MIMO) system.

6. The method of claim 1, wherein selecting base beams further comprises selecting fractional indices.

7. The method of claim 1, wherein the estimating the amplitude and cophase coefficients is based on a wide band amplitude scaling factor $\hat{p}_{r,l,i}^{WB}$ and a per subband amplitude scaling adjustment factor $\hat{p}_{r,l,k}^{SB}$.

8. The method of claim 1, wherein the correlation $\rho_{r,l,i,j}$ between the determined precoder and the selected base beams is determined as $$\rho_{r,l,i,j} = b_{x_i}^H v_{r,l,j},$$

where $$b_{x_i}^H$$

are the selected base beams and $v_{r,l,j}$ is an eigenvector.

9. The method of claim 8, wherein cophase coefficients $c_{r,l,i,k}$ are determined as $$\hat{c}_{r,l,i,k} = \frac{\rho_{r',l,o,k} \rho_{r,l,i,k}^*}{|\rho_{r',l,o,k} \rho_{r,l,i,k}^*|}.$$

10. The method of claim 8, wherein the correlation power $\beta_i^2$ between the determined precoder and determined candidate beams is determined as $\beta_i^2 = \Sigma_r \Sigma_l \Sigma_j \rho_{r,l,i,j}^2$.

11. A system for selecting precoding matrix index (PMI), comprising:
   a transmitter;
   a receiver; and
   a processor configured to:
      determine a precoder and candidate beams;
      select base beams based on a correlation power between the determined precoder and determined candidate beams; and
      estimate amplitude coefficients and cophase coefficients based on a correlation between the determined precoder and the selected base beams.

12. The system of claim 11, wherein the processor is configured to determine the precoder by a reduced dimension singular value decomposition (SVD).

13. The system of claim 12, wherein the reduced dimension SVD reduces the precoder determination from a 4×4 SVD calculation to a 2×2 SVD calculation.

14. The system of claim 11, wherein the processor is further configured to select base beams by selecting integer indices.

15. The system of claim 14, wherein the processor is further configured to select integer indices based on linear complexity in a multiple input multiple output (MIMO) system.

16. The system of claim 11, wherein the processor is further configured to select base beams by selecting fractional indices.

17. The system of claim 11, wherein the processor is further configured to estimate the amplitude and cophase coefficients based on a wide band amplitude scaling factor $\hat{p}_{r,l,i}^{WB}$ and a per subband amplitude scaling adjustment factor $\hat{p}_{r,l,i,k}^{SB}$.

18. The system of claim 11, wherein the correlation $\rho_{r,l,i,j}$ between the determined precoder and the selected base beams is determined as $$\rho_{r,l,i,j} = b_{x_i}^H v_{r,l,j},$$

where $$b_{x_i}^H$$

are the selected base beams and $v_{r,l,j}$ is an eigenvector.

19. The system of claim 18, wherein cophase coefficients $c_{r,l,i,k}$ are determined as $$\hat{c}_{r,l,i,k} = \frac{\rho_{r',l,o,k} \rho_{r,l,i,k}^*}{|\rho_{r',l,o,k} \rho_{r,l,i,k}^*|}.$$

20. The system of claim 18, wherein the correlation power $\beta_i^2$ between the determined precoder and determined candidate beams is determined as $\beta_i^2 = \Sigma_r \Sigma_l \Sigma_j \rho_{r,l,i,j}^2$.

* * * * *